July 22, 1930.  C. E. PIOCH  1,771,058
WORK LOCATING PIN FOR JIGS
Filed June 9, 1926

Inventor
Carl E. Pioch,
By
Attorneys

Patented July 22, 1930

1,771,058

UNITED STATES PATENT OFFICE

CARL E. FIOCH, OF DETROIT, MICHIGAN, ASSIGNOR OF ONE-HALF TO ALAN H. PEARSON, OF DETROIT, MICHIGAN

WORK-LOCATING PIN FOR JIGS

Application filed June 9, 1926. Serial No. 114,764.

This invention relates to a device for use where great accuracy is required in locating work during machining operations or for temporarily holding one part, member or device relative to another while certain operations are performed or work done, the device relating more specifically to improvements in so called locating pins.

Locating devices of this character usually comprise an accurately formed stud or pin rigidly and permanently set within one member or part to engage an opening within the other member or part and accurately align or hold the parts in the desired relation while certain operations are being performed or work done and so that the parts or members may be readily separated and one part removed from the other when the operation is completed, the locating device remaining in position on one part or member to again align the members during succeeding operations. This repeated engagement and disengagement of the locating device soon causes wear which affects its accuracy and injury to the locator is imminent at all times, particularly where the removable part or member is heavy and cumbersome, and therefore it has been found that frequent replacement of such devices is necessary.
In the usual construction, as the locator is rigidly and permanently fixed within an opening in the member or part by which it is carried, considerable time and skill is required to make such replacement and during this time the parts or members cannot be used. Where such locators are used in connection with fixtures for properly locating work upon a metal working machine, it is necessary to remove the fixture from the machine in order to make the repair, with consequent loss in time and production and in those cases where the locating pin is broken off, it is often necessary to bore out the remaining portion of the pin, and reform the hole to receive a new pin, thus causing a further loss and in some cases necessitating the making of an entirely new fixture.

An object of the present invention is to provide a locator which may be quickly and easily removed and replaced when worn or injured and which will have the necessary accuracy and rigidity. A further object is to provide certain other new and useful features, all as hereinafter more fully set forth.

With the above and other ends in view, the invention consists in the matters hereinafter set forth and more particularly pointed out in the appended claim, reference being had to the accompanying drawing in which Figure 1 is a view showing the application of a device embodying the invention, to a fixture employed in connection with a boring machine, as illustrative of one use to which the invention may be put;

Figure 3:
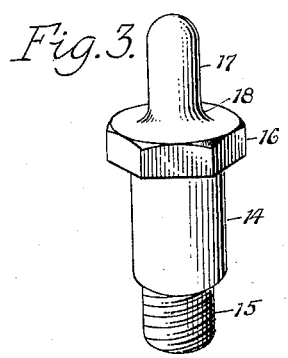
Fig. 3 is a perspective view of the detachable pin or stud.

As an illustration of one use to which the devices embodying the present invention may be put, a fixture 1 of suitable form for application to the table of a boring machine, not shown, is provided with vertical bores or openings accurately located relative to the axis of a boring tool 2 of the machine, and relative to accurately located holes in the work, which work as illustrated, is a cast block for an internal combustion engine, said block comprising a cylinder portion 3 to be bored by the tool 2 and a crank case portion 4 having a base flange 5 provided with bolt holes 6 which are utilized to receive locating pins on the fixture 1 and accurately position the cylinder 3 relative to the tool 2 of the boring machine. With locating devices properly set in the fixture 1 and the fixture properly located relative to the axis of the boring tool 2, cylinders may be accurately bored, one after another, by simply setting the work in place upon the fixture with the locating pins engaged in the holes in the flange of the crank case, but such pins must be accurately set, must fit such holes, and this accuracy must be maintained.

Figure 6:
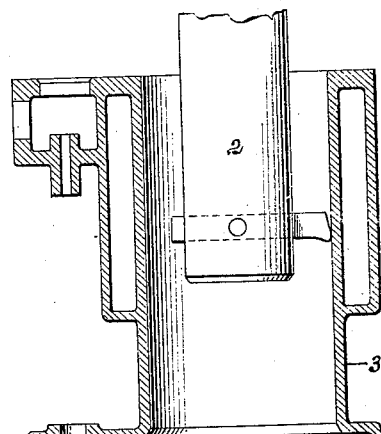
Fig. 6 is a view showing a slightly modified form of stud or pin.
Figure 6:
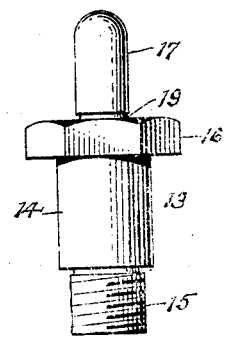
Figure 4:
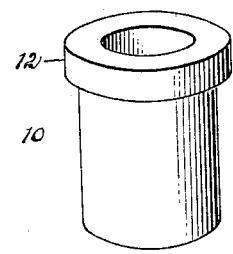
Fig. 4 is a similar view of the socket member.
Figure 1:
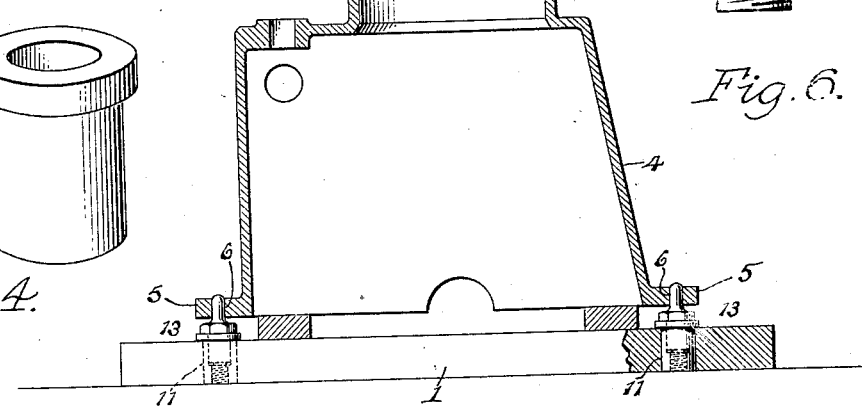
Figure 2:
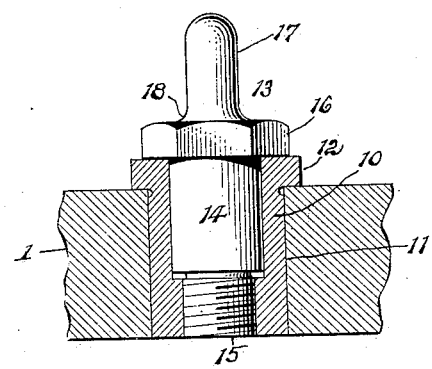
Fig. 2 is a detail view of the device showing the detachable pin or stud thereof in elevation and in place within a socket member which is shown in section and in place within an opening in a part or member in connection with which the locator is adapted to be used;
Figure 5:
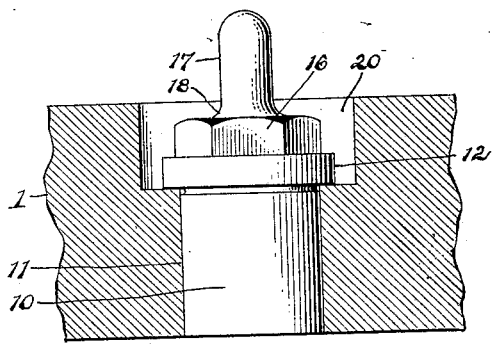
Fig. 5 is a sectional detail illustrative of a modification of the application of the locator to a part or member in conjunction with which it is adapted to be used.

The usual practice is to simply secure plain locating pins within openings in the fixture, but to obviate the difficulty arising from the removal and replacement of such pins, a locator of the character shown is provided, such locator comprising a hardened bushing 10 to accurately fit an opening or bore 11 in the fixture or other part or member and be permanently set therein, said bushing having a lateral flange 12 at its upper end to seat upon the upper surface of the fixture and being bored axially to receive the detachable pin member which is indicated as a whole by the numeral 13. This member 13 has a cylindrical shank portion 14 to fit within the bore of the bushing and the lower end 15 of the pin is reduced in diameter and externally screwthreaded to engage the reduced and screwthreaded lower end of the bore. Adjacent the upper end of the shank 14, the pin is formed with a hexagonal head or flange 16 to seat upon the upper end of the bushing and to form a wrench hold by means of which the pin member may be screwed into the bushing member. The pin or pilot proper, or that portion 17 which is adapted to enter and fit within a hole in the work, is formed integral with and axially of the head 16, and is accurately formed and rounded at its upper end to fit the hole in the work and to enter readily therein, the angle of juncture of the pilot 17 with the head 16 being formed with a fillet 18 in those cases where a rightangle juncture is not necessary as illustrated in Fig. 1 or a slight groove 19, as shown in Fig. 6, may be provided at this line of juncture so that the part, member or work engaged by the pilot may rest accurately upon the upper face of the head 16 which will thus form an accurate bearing for the work. A seat or bearing for the work, other than the head 16 may be provided by enlarging the upper end of the opening in the fixture 1 as shown in Fig. 5 at 20, the recess thus formed being of greater depth than the height of the head 16 so that the work will rest upon the upper surface of the fixture with the accurately formed cylindrical portion only of the pilot projecting upwardly beyond said surface to enter the hole in the work, in which case the fillet 18 may be employed and the pilot 17 strengthened thereby.

By providing a locating pin which may be readily removed by means of a wrench, whenever the pin or pilot becomes worn or injured, it may be very quickly removed by a workman of ordinary skill and another pin or pilot screwed into place without the necessity for removing the fixture from the boring or other machine, and by providing the hardened bushing 10 for the pilot, the pilot is firmly and accurately held and injury to the opening in the fixture incident to the removal of the pilot is obviated and greater and permanent accuracy secured.

Changes in the size, proportion, construction and arrangement of the parts of the locator to suit its application to the work and place of installation are contemplated, as well as its application to all uses to which it is adaptable, and I do not therefore limit myself to the particular construction shown and described, except where clearly set forth in the appended claim.

Having thus fully described my invention, what I claim is:—

A device of the character described including a bushing adapted to be fitted accurately into a stationary part of a machine, and a centering pin having a smooth wall adapted to be fitted accurately into said bushing and a threaded end adapted to screw into said bushing, said pin being formed to present a smooth unbroken surface adapted to enter the work, and having an enlargement on which the work may rest, said enlargement being adapted to rest on said bushing.

In testimony whereof I affix my signature.

CARL E. PIOCH.